May 17, 1932.  T. MUNRO  1,859,104
SPRING SUSPENSION OF VEHICLES
Filed May 7, 1929
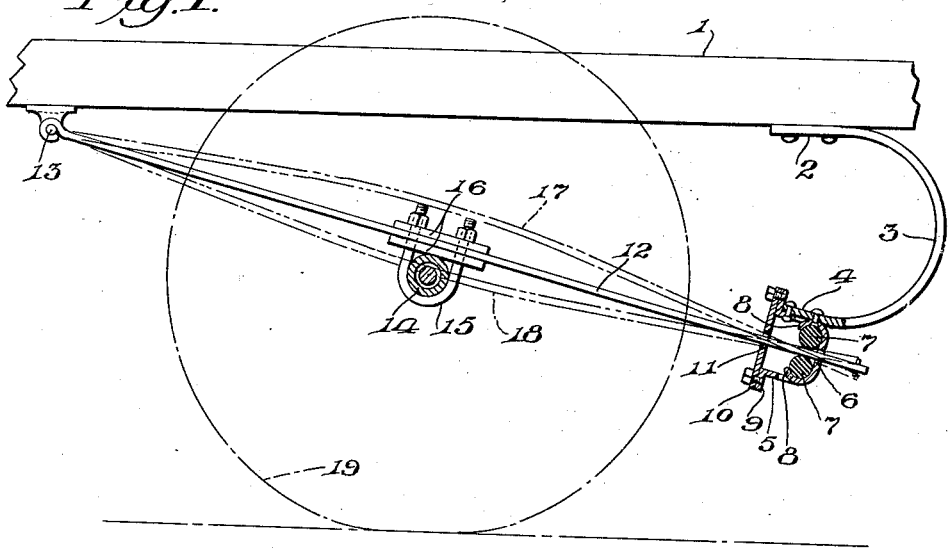
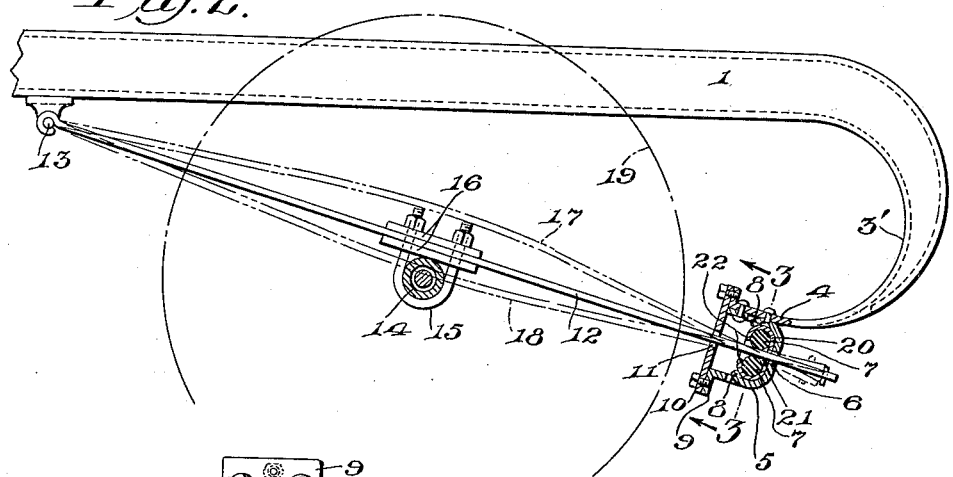
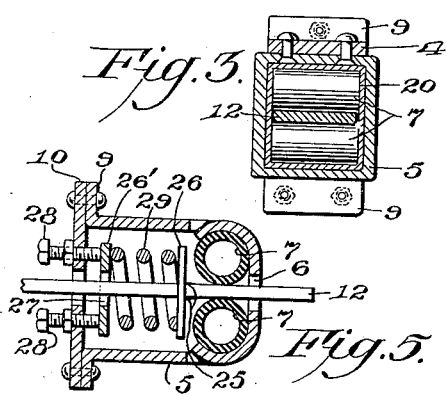
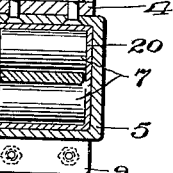
Inventor
Thomas Munro,
By J. Stuart Freeman,
Attorney.

Patented May 17, 1932

1,859,104

UNITED STATES PATENT OFFICE

THOMAS MUNRO, OF PHILADELPHIA, PENNSYLVANIA

SPRING SUSPENSION OF VEHICLES

Application filed May 7, 1929. Serial No. 361,173.

The object of the invention is to provide improvements in spring systems designed for the operative support of vehicles and particularly motor cars and the like adapted for passenger conveyance.

Another object more specifically is to provide a spring system comprising independent elements, each being connected by a substantially fixed pivot at one end, and by a sliding engagement at the other end to the frame or other suitable part of a vehicle.

A further object is to provide an element so mounted and normally tending to rest substantially in its own plane, and when flexed out of and upon either side of said plane, tending to return to such neutral position, though the neutral position of the spring element when loaded may be to one side of the natural plane of said element.

Still another object is to provide a single leaf, relatively wide spring element pivotally secured at one end either directly or through the medium of sound-deadening material to the chassis frame of a vehicle, while the opposite end of said element is slidably supported by one, or between a pair of, anti-friction members, such as roller bearings, mounted in a suitable housing, secured to another part of said frame either directly to an extension of the latter, or through the medium of a yielding member having a different natural period varying from that of the spring element.

And a still further object is to provide a spring support particularly adapted for use upon such vehicles as automobiles and the like to provide the following function. At present by way of contrast, the alternately applied motive power and brake force are frequently under the control of persons who are not of high mechanical training or even intelligence, and as a result the sudden application of the motive power through the usual clutch creates an equally sudden jerk upon the supporting springs in alignment with their longitudinal axes, and a corresponding jar is conveyed to the vehicle and its occupants, while a sudden application of the brakes causes corresponding jerks and jars in the opposite direction.

However, the present invention provides for the slanting of the longitudinal axes of the supporting springs at an angle with respect to the normal forward and rearward motion of the vehicle, so that a considerable portion of each forwardly or rearwardly force suddenly applied, whether it be motive or braking in nature, is momentarily dissipated or partially absorbed by the springs, after which it is relatively gradually conducted to the body of the vehicle and to its occupants without imposing unpleasant jars thereupon. Thus, the supporting springs of the vehicle not only primarily carry the weight of the car and contents yieldingly in a vertical direction, but of themselves serve as a buffer to protect the car and contents against abrupt changes in inertia in substantially horizontal directions.

With these and other objects in mind, the present invention comprises further details of construction and operation which are fully brought out in the following description when read in conjunction with the accompanying drawings, in which Fig. 1 is a side elevation of a fragmentary portion of a vehicle chassis frame and cooperating spring system comprising one embodiment of the invention and partly in section; Fig. 2 is a similar view of a modified form of the device; Fig. 3 is a section on the line 3—3 of Fig. 2; Fig. 4 is a section on the same line 3—3 of Fig. 2 but showing only the anti-friction bearing unit; and Fig. 5 is an enlarged fragmentary section of the bearing and housing shown in Fig. 2, but providing an adjustably tensioned spring for varying the effective tension of the main spring.

Referring to Fig. 1, any desired portion of any type of vehicle chassis 1 is shown as having fixedly secured to it at 2, one end portion of a preferably curved or looped resilient member 3, to the outer free end 4 of which is fixedly secured any suitable type of housing 5 having an elongated aperture 6 centrally positioned in one of its walls, while upon the opposite sides of said aperture are suitable roller or other form of anti-friction bearings 7, held in fixed position axially by any suitable means such for instance as the lugs 8 pressed inwardly from the normal upper and lower sides of said housing.

That side of said housing opposite to the apertured wall is open and provided with a peripheral flange 9, to which is normally secured a closure plate 10, also having an elongated aperture 11 parallel and in substantial alignment with said first-named aperture.

A spring comprising preferably a single leaf 12 is pivotally connected in any suitable manner at 13 to a portion of the chassis frame spaced from the resilient member 3, said spring leaf extending thence toward and through the apertures 11 and 6 in said housing and in direct contact with the adjacent portions of the curved surfaces of the roller bearings 7. To any desired intermediate portion of the spring leaf 12 the axle housing 14 is secured in any suitable manner, as for instance by means of the U-bolt 15 and oppositely positioned plates 16.

When the vehicle is loaded, the spring assumes substantially the position of the upper dot-and-dash lines 17 and upon a rebound enters substantially the position shown by the lower dot-and-dash lines 18 and as the housing 5 is designed to be packed with grease or other suitable lubricant, the free end portion of said spring leaf is adapted to oscillate slightly to-and-fro through said housing in a manner which is substantially devoid of frictional engagement with the resilient member 3 due to the interpositioning of said anti-friction means.

It will also be noted that while the spring leaf 12 is relatively wide, as shown in Fig. 3, for its thickness and will therefore accommodate itself to vibrations between ordinary extreme limits, the resiliency of the member 3 may be so proportioned to that of said spring leaf as to itself yield and share a portion of the force of unusual shocks exerted upon the spring leaf as the wheel indicated by dot-and-dash lines 19 encounters some unusual obstruction or road surface depression. In other words, the spring leaf 12 can readily be designed for any given weight of vehicle to operate under usual conditions, but beyond which conditions further yielding of the spring system is taken care of by the member 3.

Referring to Fig. 2, the system here illustrated is similar to that shown in Fig. 1 except that the chassis 1 is provided with a substantially rigid reversely curved extension 3′, to the outer end of which is secured the housing 5. Also, instead of securing the anti-friction rollers 7 within said housing in direct contact with the inner surface of the walls of the latter, said roller bearings may be assembled as a unit in a manner such as that illustrated in Figs. 3 and 4, wherein a box or shell 20 is provided which partially surrounds the oppositely positioned rollers 7 and is closed upon one side except for a transversely elongated aperture 21, while upon the opposite face, the sides of the shell terminate in such manner as to present a relatively larger aperture 22, so that the free end portion of the spring leaf 12 is adapted to raise freely through said shell as well as through the apertures 11 and 6 of said closure and said housing.

It is to be understood that in the foregoing description, the improved system is described broadly and that many details of construction might be varied in practicing the invention such for instance as the pivotal connection of one end of the spring leaf to the chassis and the antifrictional means whereby the free end of said spring leaf is likewise connected either directly or indirectly to said chassis. Furthermore, the effective resiliency of the said spring 12 may be altered, so as to adapt the system of spring suspension of any given car to any desired normal load.

Such an effect may be accomplished by the interposition of an adjustable auxiliary spring as shown in Fig. 5, wherein the angular edges of the main spring 12 are notched at 25 or otherwise constructed so as to receive and limit the movement of a surrounding disc 26 thereon in one direction. A second disc 26′ having an enlarged central aperture 27 loosely surrounds the spring 12 within the housing 5 and is adjustably positioned with respect to the closure plate 10 by means of bolts 28 extending therethrough. Finally, between said disc and surrounding said spring 12 is a compression spring 29, the tension of which is altered at will by adjusting the said bolts and with the result that the transverse or vertical resiliency of the main spring is supplemented by a secondary longitudinal resiliency, which cooperate to determine the proper lifting power of a given main spring for a known load.

For instance, a certain type of automobile weighing 3000 pounds may leave the factory with a spring adjustment for an average operating load of 3600 pounds. If a family of two persons purchases the car and expects to operate it regularly at an average load of approximately 3300 pounds, the tension upon the auxiliary spring 28 may be set accordingly, while an entirely different adjustment of said last-named spring is necessary for a family which may place upon the spring system of the vehicle an average of 3850 pounds. Obviously then the spring system of any car equipped with the present invention as thus described can be adjusted for any average load between certain limits without substituting anything for the stock equipment supplied with the car.

Having thus described my invention, what I claim and desire to protect by Letters Patent of the United States is:—

1. A spring system for vehicles, comprising the combination of a frame, a spring element pivotally connected at one end to said frame and slidably connected at its opposite end to another portion of said frame through the medium of a resilient member having a natural period of vibration different from that of said element, and anti-friction means carried by the free end of said member and in direct engagement with the free end portion of said element.

2. A spring system for vehicles, comprising the combination of a frame, a spring element pivotally connected at one end to said frame and slidably connected at its opposite end to another portion of said frame through the medium of a resilient member having a natural period of vibration different from that of said element, a lubricant-containing housing carried by the free end of said member and provided with aligned openings and roller bearings within said housing and in direct contact with the free end of said spring element.

In testimony whereof I have affixed my signature.

THOMAS MUNRO.